3,575,848
NATURAL MAGANESE OXIDE MINERALS AS
HYDROCARBON CONVERSION CATALYSTS
Joseph N. Miale, Trenton, N.J., assignor to
Mobil Oil Corporation
No Drawing. Filed Feb. 13, 1967, Ser. No. 615,375
Int. Cl. C10g 13/02
U.S. Cl. 208—112                                     5 Claims

ABSTRACT OF THE DISCLOSURE

Natural manganese oxide minerals are used as catalysts in hydrocarbon conversions, such as cracking.

BACKGROUND OF THE INVENTION (1) The field of the invention comprises catalysts and their use in hydrocarbon conversions.

(2) The prior art comprises U.S. Pat. No. 3,214,236, issued Oct. 26, 1965, relating to the treatment of exhaust gases from internal combustion engines by contacting the same with a catalyst comprising manganese nodules; the patent is not concerned with hydrocarbon conversions, such as to produce gasoline boiling range products; and the manganese nodules, which contain an average of about 20% by weight of silica, appear to be a silicate material.

SUMMARY OF THE INVENTION

The invention relates to the use of natural manganese oxide minerals as catalysts in hydrocarbon conversion processes. For example, a mineral like pyrolusite, it is found, is considerably useful as a catalyst in hydrocarbon cracking; in terms of alpha activity, described below, it has a cracking activity denoted by an alpha value of 14.4, which means that it is 14.4 times more active than conventional amorphous silica-alumina, itself a good cracking catalyst. The invention is also directed to the base exchange treatment of manganese oxide minerals to improve the catalytic activity thereof, particularly minerals which contain a sub-number of alkali metal and/or alkaline earth metal cations, which are exchangeable. Thus, pyrolusite, after base exchange and calcination, exhibits alpha values of at least 20 or 30.

DESCRIPTION OF THE SPECIFIC EMBODIMENTS

The natural minerals contemplated by the invention include pyrolusite, birnessite, marokite, todorokite, and woodruffite. Hydrohausmannite and psilomelane are also of value, as well as hausmannite, manganite, cesarolite, coronadite, and quenselite. Zincdibraunite and sitaparite may also be employed. These minerals are characterized by the fact that they contain at least 25%, preferably at least 50%, of manganese oxide, either as MnO or $MnO_2$ or both, and by the presence of exchangeable alkali metal and/or alkaline earth metal cations. They are further characterized by being substantially completely oxides, i.e. they contain a total of less than about 8 or 10%, preferably less than 2 or 3%, or non-manganese-containing anionic groups such as phosphate, silicate, carbonate, etc.

Pyrolusite, $MnO_2$, is a preferred mineral; it is a dark gray to black opaque mineral of dull metallic luster having a hardness of 1–2.5. It comprises 78–98.7% $MnO_2$, 0.08–0.3% CaO, about 0.2% alkalies, and about 0.05% MgO. Birnessite is a natural delta-$MnO_2$, or manganous maganite, of the formula $(Na, Ca, Mg)Mn_4O_7 \cdot 3H_2O$; the material from Cummington, Mass. comprises 66.7% $MnO_2$, 16.1% MnO, 1.1% CaO, 0.23% MgO, 0.16% $Na_2O$, and 10.8% $H_2O$, and is a dark brown opaque mineral having a hardness of 1.5. Marokite is an oxide of $Mn^{+4}$, $Mn^{+2}$, and Ca, and has the formula $CaMn_2O_4$; it comprises 38.9% $MnO_2$, 31.4% MnO, and 25.6% CaO, and is a black opaque mineral of bright luster. Todorokite, a hydrated oxide of $Mn^{+2}$, $Mn^{+4}$, and alkaline earths, has the probable formula

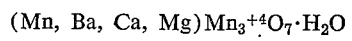

and comprises 65.9% MnO, 3.28% CaO, 2.1% BaO, 1.0% MgO, 0.5% $K_2O$, 0.2% $Na_2O$, and 9.7% $H_2O$; it is a soft mineral, black in color, and of metallic luster. A zinc-bearing todorokite is known:

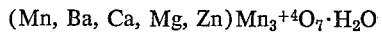

comprising 68% $MnO_2$, 6.4% MnO, 0.18% BaO, 5% CaO, 2.1% MgO, 0.15% $Na_2O$, 0.86% $K_2O$, 4.65% ZnO, and 7.8% $H_2O$. Woodruffite is a hydrate oxide of Zn, $Mn^{+2}$, and $Mn^{+4}$ of the formula

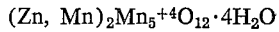

it is an iron black opaque mineral of dull luster, hardness 4.5, and comprises 64.3% $MnO_2$, 7.9% MnO, 13.9% ZnO, 0.06% MgO, 0.6% $K_2O$, 0.1% $Na_2O$, and 10.5% $H_2O$. Hydrohausmannite is a black nearly opaque mineral of the formula $(Mn^{+2}, Mn^{+3})_3(O, OH)_4$, comprising 77.8% $MnO_2$, 11.6% MnO, 1.7% MgO, 0.14% CaO, and 3–5% $H_2O$. Psilomelane, a gray to black opaque mineral of dull luster, hardness 5–6, has the formula $4MnO_2(Mn, Ba, K, O)nH_2O$; it comprises 70–90% $MnO_2$, 6–17% BaO, 1–6% $H_2O$, and may have Ca and K present.

Hausmannite, $MnMn_2O_4$, generally comprises 83–93% MnO, up to 0.4% CaO, and up to 1% MgO. It is a brownish black mineral of submetallic luster, hardness 5.5. Manganite is a basic oxide of manganese of the formula, MnO(OH), comprising 79–81% MnO, up to 0.1% CaO, up to 0.2% alkalies, and about 10% $H_2O$. It is gray to black, of submetallic luster, and hardness 4. Cesarolite is a hydrous oxide of $Mn^{+4}$ and $Pb^{+2}$, probable formula $PbMn_3O_7 \cdot H_2O$, comprising about 42.7% MnO, 36.3% Pb, plus about 0.2% $Na_2O$. Quenselite is also a hydrous oxide of $Mn^{+4}$ and $Pb^{+2}$, formula $PbMnO_2(OH)$. Coronadite is $MnPbMn_6O_{14}$, comprising 60–64% $MnO_2$, 7–9% MnO, 27–29% PbO, 0.05% CaO, plus other alkalies.

The preferred minerals contain at least about 0.05% by weight of exchangeable alkali metal or alkaline earth metal cations.

As indicated, the foregoing minerals are useful as catalysts for the conversion of hydrocarbons, particularly the cracking of suitable petroleum stocks to produce hydrocarbons in the gasoline boiling range. By virtue of their content of alkali metal and/or alkaline earth metal cations, it is desirable to convert them to the hydrogen form, wherein the said cations are at least partly replaced by hydrogen ions, as a result of which their catalytic action may be increased. To effect such conversion, the natural mineral is treated with a fluid medium containing positive ions comprising hydrogen or hydrogen ion precursors to give, ultimately, a composite having hydrogen ions. As may be apparent, "composite" is the term applied to the mineral after at least a portion of its alkali and/or alkaline earth metal cations has been replaced by hydrogen ions. The steps involved are base exchange and calcination, and the hydrogen ions are bonded to the mineral, thereby forming the composite. The latter is acidic as a result. To illustrate the treatment, the mineral may be arranged in the form of a fixed bed, and the fluid medium in the form of an aqueous solution is passed slowly through the bed at room temperature and atmospheric pressure for a time sufficient to substantially exhaust the alkali and/or alkaline earth metal cations of the original mineral. The aqueous solution is characterized by having a pH above that at which the mineral decomposes, preferably above 4, more preferably above 4.5. When the treatment is finished, the resulting composite is washed, preferably with distilled water, until the effluent wash water has a pH between 5 and 8.

The fluid medium may be aqueous or non-aqueous, preferably aqueous. Polar solvents are useful and these may be aqueous or non-aqueous. Non-aqueous solvents include organic solvents which permit ionization of hydrogen-containing substances added thereto, and which include cyclic and acyclic ethers such as dioxane, tetrahydrofuran, diethyl ether, diisopropyl ether, and the like; ketones such as acetone and methyl ethyl ketone; esters such as ethyl acetate, propyl acetate; alcohols such as ethanol, propanol, butanol, etc.; and miscellaneous solvents such as dimethylformamide, and the like. Other fluid media are carboxy polyesters. Ion-exchange resins having exchangeable hydrogen ions are also suitable.

A preferred base-exchange procedure comprises treating the mineral with an aqueous solution of a compound which supplies hydrogen ion precursor, such as ammonium ion, washing the material as described, drying it at 100–300° F., and then heating it to a temperature below its decomposition temperature to convert the substituent ammonium ions to hydrogen ions. The ammonium ions may be supplied by such compounds as ammonium chloride, ammonium bromide, ammonium iodide, and ammonium carbonate. Other representative ammonium compounds suitable herein are described in U.S. Pats. Nos. 3,140,252 and 3,140,253. The concentration of ammonium compound in the base-exchange solution is usually up to 5% by weight, but may be higher. It may also be noted that mono-, di-, and trialkylammonium, as well as mono-, di-, and triarylammonium salts are capable of supplying substituted ammonium cations which, on calcination, are converted to hydrogen ions; thus these salts are also of value for the base exchange.

The temperature of the base-exchange fluid contacting step may vary from ambient temperatures, and below, to temperatures just below that at which the mineral decomposes. Pressures are also variable from sub-atmospheric to super-atmospheric. The time of treatment, as indicated, is that sufficient to permit the alkali metal and/or alkaline earth metal cations of the starting mineral to become substantially replaced. At the conclusion of the step, the material is dried, as by heating to 100–300° F. for a period of up to 10 or 20 hours.

After base exchange and drying, the resulting materials is calcined in air at 800–1400° F., preferably 1000° F., for up to 10 or 20 hours. The calcining converts the ammonium or substituted ammonium ion to hydrogen ion.

The resulting composite may have bonded thereto at least 0.01 g., and preferably 0.01 to 0.5 g., of hydrogen ions per 100 g. of composite.

If desired, the mineral, either before, during, or after base exchange, may be mixed in any desired way with a matrix, generally comprising a porous inorganic oxide, which can serve as a binder during pelleting of the catalyst and, if suitably chosen, may act as an auxiliary catalyst. A number of suitable matrixes are set forth in U.S. Pat. No. 3,210,267 and include silica-alumina gel, silica gel, alumina gel; also gels of alumina-boria, silica-zirconia, silica-magnesia, etc. Natural clays are useful, such as kaolin, attapulgite, kaolinite, bentonite, montmorillonite, etc., and if desired, the clays may be calcined or chemically treated as with an acid or alkali.

The invention also contemplates mixing one or more base-exchanged minerals with a crystalline aluminosilicate, such as Zeolite X, Zeolite Y, or any of those described in the aforementioned U.S. Pats. Nos. 3,140,252 and 3,140,253.

Turning now to a consideration of hydrocarbon conversions, these include cracking, hydrocracking, hydrogenation, and isomerization.

Cracking of suitable hydrocarbon stocks is generally carried out at a temperature of 800–1100° F., a pressure ranging from substmospheric to several hundred atmospheres, and a LHSV of 1 to 10 to produce valuable products in the gasoline boiling range. The charge stock may be any material heretofore used in conventional cracking using conventional silica-alumina catalyst.

The process may be carried out in any equipment suitable for catalytic operations, and may be operated batchwise or continuously, and with a fixed bed of catalyst or a moving bed wherein the hydrocarbon flow may be concurrent or countercurrent to the catalyst flow. A fluid type of operation may also be employed. The resulting products may suitably be separated by conventional means. Also, the catalyst after use over an extended period of time may be regenerated in accordance with conventional procedures by burning off carbonaceous deposits from the surface of the catalyst in an oxygen-containing atmosphere under conditions of elevated temperature.

Hydrocracking is generally carried out at a temperature between 400 and 900° F. The hydrogen pressure in such operation is generally within the range of 100 and 3000 p.s.i.g. and, preferably, 350 to 2000 p.s.i.g. The LHSV is between 0.1 and 10. In general, the molar ratio of hydrogen to hydrocarbon charge is between 2 and 80, preferably 5 and 50. Suitable charge stocks comprise petroleum fractions boiling at 400 to 600° F. and higher, and including gas oils, residual oils, cycle stocks, whole topped crudes and heavy hydrocarbon fractions derived by the destructive hydrogenation of coal, tars, pitches, asphalts an the like.

In olefin hydrogenation the reaction temperature may range up to 1000° F., the pressure from 10 to 3000 p.s.i.g. and the LHSV from 0.1 to 10. The operation is useful to form corresponding saturated hydrocarbons, to remove gum formers from gasoline, and to pretreat stocks for cracking, hydrocracking, etc.

Olefin isomerization, comprising the shift of a double bond in an olefin, is suitably performed at 30 to 900° F., a pressure of 1 to 10 atmospheres, and an LHSV of 0.1 to 10. The process is of value in the manufacture of olefin addition products such as alcohols and alkyl halides.

The invention may be illustrated by the following examples:

EXAMPLE 1

A sample of natural pyrolusite from Ironton, Minn. was ground to a fine powder and then pelleted. Of this, a 1.0 ml. aliquot portion was taken and tested for n-hexane cracking activity at 1000° F., using the conventional alpha test. In this test, which is a micro test, the activity of the cataylst is reported in terms of alpha activity, by which is meant the conversion capability, as determined in the micro test, of the pyrolusite by comparison with that of a conventional amorphous silica-alumina cracking catalyst (90% $SiO_2$–10% $AlO_2$) in the cracking of n-hexane. The particular silica-alumina catalyst referred to is one having an activity index of A.I., of 46 as measured by the well known "Cat A test," which is described in National Petroleum News 36 R-537 (Aug. 2, 1944), and in patents like 2,485,626 and 2,697,066. In the micro test, which is described in Journal of Catalysis, 4 No. 4 527–9 (1965), the alpha value of the pyrolusite represents its comparative activity relative to an activity of 1 for the conventional silica-alumina catalyst.

The pyrolusite was found to have an alpha value of 14.4.

The test was repeated, using synthetic manganese dioxide (Baker's reagent grade $MnO_2$) instead of natural pyrolusite, and an alpha value of 7.0 resulted. It may thus be noted the natural pyrolusite is 14.4 times more active than conventional amorphous silica-alumina, the latter being a good cracking catalyst.

EXAMPLE 2

A 2-ml. sample of the same pyrolusite used in Example 1, was contacted with 100 ml. of a 5% by weight aqueous solution of ammonium chloride over a period of 4 hours, after which the sample was washed with water and dried at 110° C. for 1 hour. Of this, a 1-ml. aliquot was taken and calcined at 1000° F. for 10 hours, and then used in the n-hexane cracking test, described in Example 1, at a cracking temperature of 900° F., regenerated in air, and retested at 700° F., giving an alpha value of 46.

It will be understood that the invention is capable of obvious variations without departing from its scope.

In light of the foregoing description, the following is claimed.

I claim:

1. A method for making a catalyst useful in hydrocarbon conversions which comprises ion exchanging a natural manganese oxide mineral containing alkali metal or alkaline earth metal cations by treating the same with a fluid medium containing exchangeable hydrogen ion precursor, calcining the resulting material, and thereby producing a ion-exchanged calcined manganese oxide product having hydrogen ions bonded thereto in an amount of 0.01 to 0.5 g. per 100 g. of said product.

2. Method of claim 1 wherein said mineral is pyrolusite.

3. Method of claim 1 wherein said ion exchanging comprises treating with a solution of a salt capable of supplying hydrogen ion precursor selected from ammonium, alkylammonium, and arylammonium ions, thereby to replace at least a portion of said alkali metal and/or alkaline earth metal cations by said hydrogen ion precursor.

4. A method of effecting hydrocarbon conversions which comprises contacting a hydrocarbon under conversion conditions with a catalyst comprising an ion-exchanged, calcined natural magnanese oxide mineral having hydrogen ions bonded thereto in an amount of 0.01 to 0.5 grams per 100 grams of said mineral.

5. Method of claim 4 wherein said hydrocarbon conversion step is a cracking step carried out under cracking conditions.

References Cited
UNITED STATES PATENTS

| | | | |
|---|---|---|---|
| 1,448,110 | 3/1923 | De Olaneta | 23—145X |
| 1,343,585 | 6/1920 | Ruhoff | 23—145X |
| 1,937,488 | 11/1933 | Jenness | 23—234 |
| 2,288,613 | 7/1942 | Dill | 75—89 |
| 2,792,436 | 5/1957 | Kroeper | 260—675.5 |
| 2,818,451 | 12/1957 | Myers | 260—668 |
| 3,214,236 | 10/1965 | Weise | 23—2 |
| 3,236,761 | 2/1966 | Rabo | 208—111 |

FOREIGN PATENTS

| | | | |
|---|---|---|---|
| 75,159 | 1/1919 | Austria | 208—121 |

DANIEL E. WYMAN, Primary Examiner

P. M. FRENCH, Assistant Examiner

U.S. Cl. X.R.

252—471; 260—683.2, 683.9; 208—121

PO-1050
(5/69)

UNITED STATES PATENT OFFICE
CERTIFICATE OF CORRECTION

Patent No. 3,575,848          Dated April 20, 1971

Inventor(s) Joseph N. Miale

It is certified that error appears in the above-identified patent and that said Letters Patent are hereby corrected as shown below:

| | |
|---|---|
| Column 2, Line 17, | "hydrate" should be --hydrated--. |
| Column 2, Line 24, | "0.06% MgO" should be --0.6% MgO--. |
| Column 2, Line 43, | "PbMno$_2$(OH)" should be --PbMnO$_2$(OH)--. |
| Column 4, Line 3, | "substmospheric" should be --subatmospher |
| Column 4, Line 31, | "an" should be --and--. |
| Column 4, Line 73, | "the" should be --that--. |

Signed and sealed this 14th day of September 1971.

(SEAL)
Attest:

EDWARD M. FLETCHER, JR.
Attesting Officer

ROBERT GOTTSCHALK
Acting Commissioner of Paten